United States Patent
Perry et al.

(10) Patent No.: US 12,541,627 B2
(45) Date of Patent: Feb. 3, 2026

(54) APPARATUS AND METHOD FOR STRUCTURED PART QUOTING

(71) Applicant: PROTOLABS, INC., Maple Plain, MN (US)

(72) Inventors: Austin Perry, Maple Plain, MN (US); Joshua Knutson, Maple Plain, MN (US); Robert Ford, Maple Plain, MN (US); Samuel Bosak, Maple Plain, MN (US); Shuji Usui, Maple Plain, MN (US)

(73) Assignee: PROTOLABS, INC., Maple Plain, MN (US)

( * ) Notice: Subject to any disclaimer, the term of this patent is extended or adjusted under 35 U.S.C. 154(b) by 8 days.

(21) Appl. No.: 18/208,175

(22) Filed: Jun. 9, 2023

(65) Prior Publication Data

US 2024/0411946 A1   Dec. 12, 2024

(51) Int. Cl.
*G06F 30/17* (2020.01)
*G06F 30/20* (2020.01)
*G06F 30/27* (2020.01)

(52) U.S. Cl.
CPC ............ *G06F 30/17* (2020.01); *G06F 30/20* (2020.01); *G06F 30/27* (2020.01)

(58) Field of Classification Search
CPC .......... G06F 30/17; G06F 30/20; G06F 30/27
See application file for complete search history.

(56) References Cited

U.S. PATENT DOCUMENTS

| | | | |
|---|---|---|---|
| 10,466,681 B1* | 11/2019 | Jones | G05B 19/40937 |
| 11,276,095 B1* | 3/2022 | Jacobs | G06Q 30/0641 |
| 2020/0218858 A1* | 7/2020 | Sawyer | G06F 18/214 |
| 2021/0004369 A1 | 1/2021 | Jones | |
| 2021/0133788 A1* | 5/2021 | Jacobs | G06Q 10/0637 |
| 2021/0174408 A1* | 6/2021 | Usui | G06F 18/23 |
| 2021/0303743 A1* | 9/2021 | Usui | G06F 30/27 |
| 2022/0156434 A1 | 5/2022 | Razzell | |
| 2022/0214666 A1 | 7/2022 | King | |
| 2022/0414293 A1 | 12/2022 | Guo | |

FOREIGN PATENT DOCUMENTS

WO   WO-2018078590 A2 *   5/2018   ........... B29C 64/393

* cited by examiner

*Primary Examiner* — Ryan F Pitaro
*Assistant Examiner* — Pursottam Giri
(74) *Attorney, Agent, or Firm* — Caldwell Intellectual Property Law

(57) ABSTRACT

An apparatus for structured part quoting. The apparatus includes a processor and a memory, configured to receive part data from a user and generate a part model and a print for manufacture. The apparatus verifies an alignment datum and determines a machinability datum, and identifies any unmanufacturable features in the part. Based on this information, the apparatus generates a manufacturing quote using a first quoting process and an alternate manufacturing quote using a second quoting process, taking into consideration the machinability datum and the identification of any unmanufacturable features.

16 Claims, 6 Drawing Sheets

APPARATUS AND METHOD FOR STRUCTURED PART QUOTING

FIELD OF THE INVENTION

The present invention generally relates to the field of quote generation using computer-aided models. In particular, the present invention is directed to an apparatus and method for structured part quoting.

BACKGROUND

Computer-aided drawings typically convey information about a to-be-fabricated structure, such as a part or an assembly of components of a part. However, some parts may not have the correct tolerance to be connected to an assembly or manufacturing of that part may be too difficult.

SUMMARY OF THE DISCLOSURE

In an aspect an apparatus for structured part quoting is disclosed. The apparatus includes at least a processor and a memory configuring the at least a processor to receive a part data from a user, generate a part model as a function of the part data, generate a print of a part for manufacture as a function of the part model, wherein the part for manufacture is configured to be in a first orientation within the print, verify an alignment datum using the part model, determine a machinability datum as a function of the print of the part for manufacture and the part model, identify an unmanufacturable feature of the part to be manufactured as a function of the machinability datum, generate a manufacturing quote using a first quoting process as a function of the machinability datum of the part to be manufactured and generate an alternate manufacturing quote using a second quoting process as a function of the machinability datum of the part to be manufactured and the identification of an unmanufacturable feature.

In another aspect a method for structured part quoting is disclosed. The method includes receiving, by at least a processor, a part data from a user, generating, by the at least a processor, a part model as a function of the part data, generating, by the at least a processor, a print of a part for manufacture as a function of the part model, wherein the part for manufacture is configured to be in a first orientation within the print, verifying, by the at least a processor, an alignment datum using the part model, determining, by the at least a processor, a machinability datum as a function of the print of the part for manufacture and the part model, identifying, by the at least a processor, an unmanufacturable feature of the part to be manufactured as a function of the machinability datum generating, by the at least a processor, a manufacturing quote using a first quoting process as a function of the machinability datum of the part to be manufactured and generating, by the at least a processor, an alternate manufacturing quote using a second quoting process as a function of the machinability datum of the part to be manufactured and the identification of an unmanufacturable feature These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and method for structured part quoting. In an embodiment, apparatus and method generate an alternate manufacturing quote based on, at least, tooling capabilities and manufacturability of part requested.

Aspects of the present disclosure allow for structured quoting of parts to be manufactured. Exemplary embodiments illustrating aspects of the present disclosure are described below in the context of several specific examples.

Figure 1:
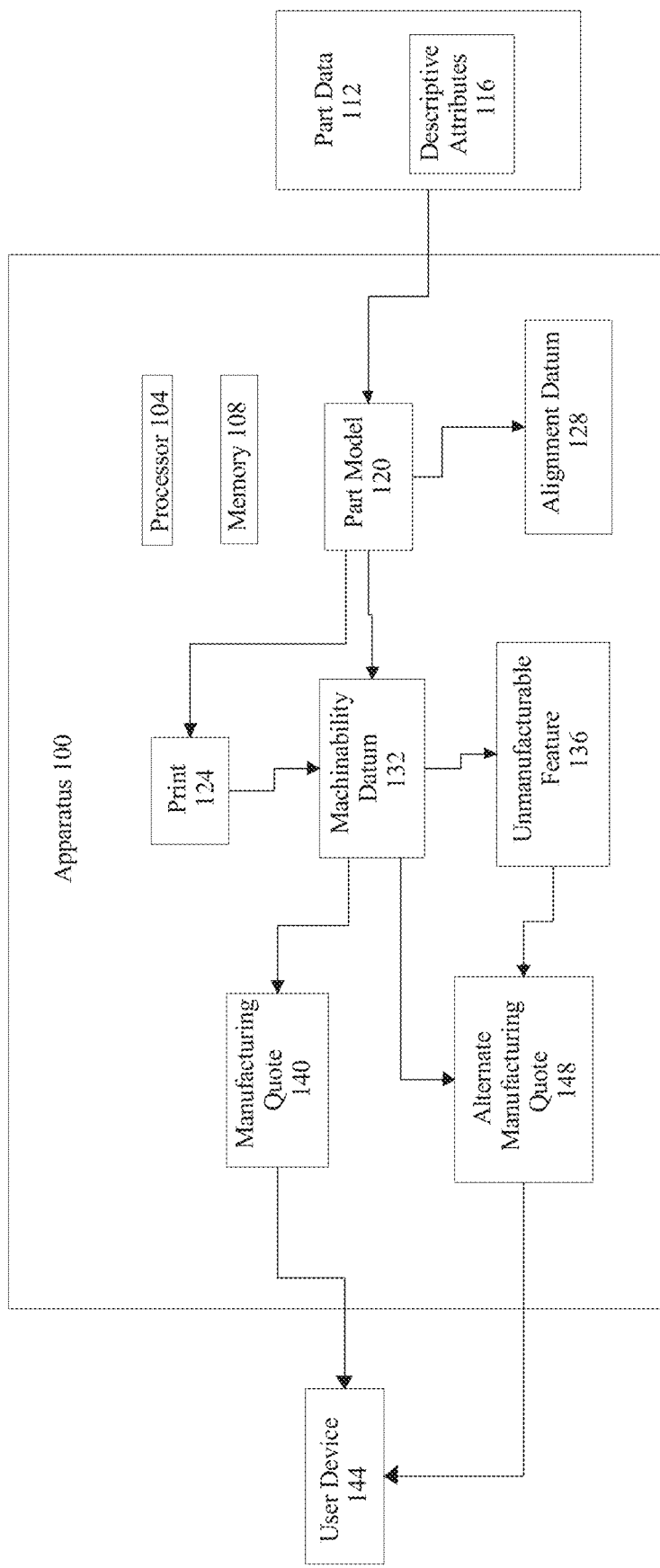
FIG. 1 is an exemplary block diagram illustrating an apparatus for structured part quoting.

Referring now to FIG. 1, an exemplary embodiment of an apparatus 100 for structured part quoting is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or processor 104.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, apparatus 100 includes a memory 108 communicatively connected to the at least a processor 104, wherein the memory 108 contains instructions configuring processor 104 to perform tasks in accordance with this disclosure. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, memory 108 contains instructions configuring processor 104 to receive a part data 112 from a user. A "part data," as used herein is at least an element of data associated with a part to be manufactured. A part to be manufactured may include any item made of materials such as metals including, for example, aluminum and steel alloys, brass, and the like, plastics, such as nylon, acrylic, ABS, Delrin, polycarbonate, foam, composites, wood, and the like. In some embodiments, part data 112 may include any descriptive attributes 116 of a part to be manufactured. "Descriptive attributes," as used in this disclosure, are any features, limitations, details, restrictions and/or specifications related to manufacturing of a part. Descriptive attributes 116 may include, without limitation, any features, limitations, details, restrictions and/or specifications relating to a part geometry, materials, finishes, connections, hardware, special processes, dimensions, and the like. Descriptive attributes 116 may include a tolerance of the part to be manufactured. A "tolerance," as used herein, an allowable amount of variation of a specified quantity. For example, a especially in the dimensions of a machine or part. Descriptive attributes 116 may further include, without limitation, any features, limitations, details, restrictions, and/or specifications relating to a total request for manufacture, such as a request for pricing, estimated time for completion and the like. In a nonlimiting example, descriptive attributes 116 may include a desired material for manufacturing, using metal, such as aluminum, steel alloy, brass, and the like. In some embodiments, part data 112 may be received by user input on a graphical user interface (GUI) of a computing device communicatively connected to processor 104. In an embodiment, part data 112 may be shown to a user as a list, wherein the user may select at least a descriptive attribute 116 out of the list of descriptive attributes 116. In a non-limiting example, a user may be presented with a plurality of descriptive attributes 116 such as material of part to be manufactured, dimensions, tolerance levels, such as when a part is configured to be connected to an assembly, where user may select the desired options to be sent to processor 104. Persons skilled in the art, upon reviewing the entirety of this disclosure, will be aware of various descriptive attributes which may be suitable for part data consistent with this disclosure.

With continued reference to FIG. 1, memory 108 contains instructions configuring processor 104 to generate a part model 120 as a function of part data 112. A "part model," as used herein, is a computer model of a part to be manufactured. Part model 120 may further include any data describing and/or relating to a computer model of a part to be manufactured. A "computer model," as described herein, is a digital model of a physical structure as created using computer-aided design (CAD) modeling software. In an embodiment, processor 104 may generate part model 120 using a computer-aided design (CAD) modeling software. Computer model may include a 3D model that may be created through the use of computer-aided design. For example and without limitation, computer-aided design (CAD) software may include SOLIDWORKS® software and/or CATIA software (available from Dassault Systèmes SolidWorks Corp, Waltham, Massachusetts), AUTOCAD® software and/or Fusion 360 software (available from Autodesk, Inc., San Rafael, California), PTC Creo software (available from PTC, Inc., Boston, Massachusetts), Siemens NX software (available from Siemens PLM Software, Plano, Texas) and MICROSTATION® software (available from Bentley Systems, Inc., Exton, Pennsylvania), and the like. The computer model may include any modeling type, such as, without limitation, a wireframe, solid model and/or any combination thereof. The computer model may be saved in a computer file using any suitable file protocol, such as, without limitation, SolidWorks part file (.SLDPRT), several SolidWorks part files organized into a single assembly (.SLDASM), 3D assembly file supported by various mechanical design programs (.STP), graphics file saved in a 2D/3D vector format based on the Initial Graphics Exchange Specification (.IGS) and/or the like. The computer model further includes information about the geometry and/or other defining properties of the mechanical part's structure. The computer model may include a polygon mesh, such as a collection of vertices, edges, and faces, that define the shape of part model 120. For example, and without limitation, the faces of the polygon mesh may include triangles, such as a triangle mesh, quadrilaterals, or other simple convex polygons.

Continuing to refer to FIG. 1, part model 120, in some embodiments, may include a plurality of sides. Each side of plurality of sides, as used in this disclosure, may include a view of part model 120 from a plane orthogonal to an axis passing through an origin of part model 120. The axis may include, as a non-limiting example, a three-axis coordinate system, such as the x-axis, y-axis, and z-axis, or abscissa, ordinate, and applicate. The axis may include, as a further non-limiting example, any axis passing through an origin of the representative part model. Persons skilled in the art, upon reviewing the entirety of this disclosure, will be aware of axes which may be suitable for use as each side of the plurality of sides consistently with this disclosure. The origin of the part model, as described herein, is a fixed point of reference for part model 120. For example, and without limitation, the origin may include the center of mass, the geometric center, the center of a feature of the part, wherein a feature may be a hole, a well, a groove, a pocket, a channel, extruded volume, and the like. As a further example and without limitation, the origin may include any position of part model 120. In some embodiments, part model 120 may include a physical example of the part to manufacture.

Continuing to refer to FIG. 1, in some embodiments, part model 120 may be modified or generated as a function of a manufacturing machine learning model. Manufacturing machine learning model may include any machine learning model described throughout this disclosure. In an embodiment, manufacturing machine learning model may receive descriptive attributes 116 as input and output a computer model, where processor 104 may compare the output of manufacturing machine learning model to a print model generated by processor 104 and generate a modified part model 120 as a function of the comparison. A modified part model 120 may be equal to the computer model generated by manufacturing machine learning model. A modified part data 120 may be the same as part data 120 generated by processor 104. In a nonlimiting example, when part model 120 and computer model outputted by manufacturing machine learning model as equal, a modified part model 120 may be the same as the part model 120 generated by processor 104. Manufacturing machine leaning model may be trained using manufacturing training data. Manufacturing training data may include past outputs of manufacturing machine learning model. Manufacturing training data may include previously generated part models 120. Manufacturing training data may include examples of descriptive attributes 116 correlated to part models 120 previously generated with those attributes. Manufacturing training data may include previous part models 120 generated by different computer modeling software. In a nonlimiting example, processor 104 may generate part model 120 with part data 112 provided by user, then processor 104 inputs descriptive attributes 116 from part data 112 into a trained manufacturing machine learning model, where the machine learning model outputs a computer model, processor 104 then compares the generated print model 120 and computer model and generates a modified print model 120 based on the comparison. In a further nonlimiting example, processor 104 may generate part model 120 with the descriptive attributes 116, compare the part model 120 generated with the computer model outputted by the manufacturing machine learning model and then use computer model outputted as print model 120 to be used. In some embodiments, processor 104 may transmit manufacturing machine learning model output and part model 120 to a computing device communicatively connected to processor 104. In a further embodiment, a user may be prompt to select between computer model outputted by machine learning model and part model 120. In a further embodiment, processor 104 may be configured to receive user selection, where user selection is used as part model 120. In a nonlimiting example, user may choose between the part data 120 generated by processor 104 and a computer model outputted by the manufacturing machine learning model, where the computer model outputted may be a variation that is preferable to the user. In another nonlimiting example, machine learning models are described in more detail in relation to FIG. 4.

Continuing to refer to FIG. 1, memory 108 contains instructions configuring processor 104 to generate a print 124 of a part to be manufactured as a function of the part model 120, wherein the part to be manufactured is in a first orientation within the print. A "print" of a part to be manufactured, as used herein, is a two-dimensional digital model of a physical structure. For instance and without limitation print may be created using a two-dimensional modeling application. As used in this disclosure, "two-dimensional" means having, appearing to have, or displaying two out of the three dimensions. In embodiments, print 124 may include semantic information of part to be manufactured. Print 124 may include geometric dimensioning and tolerancing (GD&T) information, which may be provided in one or more software files such as DXF files, DWG files, PDF files, and/or the like. A "geometric dimensioning and tolerancing," as used herein, is a symbolic language used on engineering drawings and models to define the allowable deviation of feature geometry. GD&T may include feature control frames, as discussed in more detail below. GD&T is based on standards set by the American Society of Mechanical Engineers, ASME Y14.5M-1004 and ASME Y14.41-2003. Print 124 may be received with part model 120 or received in a separate transmission and/or from another source. "Semantic information," as described in this disclosure, is data concerning and/or describing product and manufacturing information (PMI) and product life cycle management (PLM). In some embodiments, semantic information may include model based definition (MBD) and functional dimensioning and tolerancing (FDT). As used in this disclosure, "PMI" is data describing non-geometric attributes of a model of a part to be manufactured, such as the computer model of part model 120, necessary for manufacturing the part, components of the part, and associated assemblies. For example, and without limitation, PMI may include geometric dimensions and tolerancing information (GD&T), 3D annotation and dimensions, surface roughness, 2D annotation and dimensions, surface finish, material specifications, and the like. In some embodiments, PMI may include details about the machinability of the part to be manufactured. PMI may include textual data, such as alphanumeric, punctuation, typographical symbols, character, string data, and/or any textual data as described in the entirety of this disclosure. "PLM," as used in this disclosure, is any data concerning and/or describing management of the lifecycle of the part from inception, through engineering design and manufacture, to service and disposal of the manufactured part. PLM may include textual data, such as alphanumeric, punctuation, typographical symbols, character, string data, and/or any textual data as described in the entirety of this disclosure. In an embodiment, semantic information included in part model 120 may be used in processes for pricing a part to be manufactured. As used in this disclosure, "MBD" is data describing design and manufacturing information using a 3D model as a single source of truth (SSOT). As used herein, "SSOT" is a source of information that is used through the entire product lifecycle, from design to manufacturing. MBD may include details about machinability of the part such as geometry, dimensions, tolerances, materials, finish requirements and the like. As used herein, "FDT" is a symbolic language used to define and communicate tolerance and dimensions for parts to be manufactured, or assembled, that are based on the functional requirements of the part.

Continuing to refer to FIG. 1, first orientation within print 124 may include orthogonal side views of a part to be manufactured such as a front view, top view, and/or left or right view. As used in this disclosure, a "side view" is an image of a side of a part to be manufactured. In a nonlimiting example, side view may be a view of a right side or left side of part to be manufactured. A "top view," as used herein, is an image of a top side of a part to be manufactured. A "bottom view," as used herein, is an image of a bottom side of a part to be manufactured. Print 124 may also include one or more section views of part to be manufactured. A "section view", as used in this disclosure, is an image of a part to be manufactured that includes an internal section of the part to be manufactured. An example of a section view is a cross-sectional view of the part to be manufactured. Processor 104 may be configured to decompose side view of print 124 of part to be manufactured. Processor 104 may also be configured to decompose section view of print 124 of part to be manufactured. As used in this disclosure, to "decompose" is to locate and identify an object, feature, image, and/or component thereof in a print 124, such as a view of a part to be manufactured included in the print 124 or a feature of a part to be manufactured within a view in the print 124. A "feature", as used in this disclosure, is a distinct component of part to be manufactured. Examples of a feature include a detent, hole, indentation, pulley, edge, corner, curve, contour, side, circle, ellipse, line, cylindrical surface, plane, groove, ring, fillet, boss and/or the like. Decomposing side view and/or section view of print 124 may include identifying and distinguishing the side view and/or the section view from the remainder of print 124 such that processor 104 may compare the side view and/or the section view in relation to print model 120 separately from the remainder of the print 124. Decomposing a side view and/or section view of print 124 may include utilizing bounding boxes. A bounding box is a rectangular perimeter that surrounds an identified object, feature, image, and/or component thereof in print 124, such as a side view, section view, and/or feature within a side view or section view. Bounding boxes may be used to locate and identify a side view and/or section view in print 124. Bounding boxes may be used to distinguish and separate the respective views from each other and any remaining portion of print 124. Bounding boxes may be used to locate and identify one or more features of part to be manufactured in print 124, such as features in a side view and/or features in section view. Bounding box may include the smallest rectangular dimension that fits the entire identified object, feature, image, and/or component thereof within the bounding box. For example, if side view of part to be manufactured, as shown in print 124, is three inches tall as its greatest length and four inches wide at its greatest width, bounding box encompassing the side view may be a rectangle approximately three inches high and four inches wide. As another example, if a feature of part to be manufactured shown in a side view as an ellipse is two inches tall and one inch wide, a bounding box encompassing the feature may be a rectangle approximately two inches high and one inch wide. Print 124 may include any print described in U.S. patent application Ser. No. 17/689,166, filed on Mar. 8, 2022, and titled "APPARATUS AND METHODS FOR SUPERIMPOSING TWO-DIMENSIONAL PRINTS ONTO THREE-DIMENSIONAL MODELS OF A PART FOR MANUFACTURE," which is incorporated by reference herein in its entirety.

Still referring to FIG. 1, memory 108 contains instructions configuring processor 104 to verify an alignment datum 128 using part model 120. An "alignment datum," as used herein, is an element of data describing how the part to be manufactured fits with other parts within an assembly. An "assembly," as used herein, is a combinations of two or more parts that are configured to be connected to each other. In an embodiment, processor 104 may be configured to receive part data 112 comprising a tolerance of the part to be manufactured, and verify alignment datum 128 by checking the tolerance of the part to be manufactured and comparing the tolerance to a range of tolerances that would allow the part to be manufactured to function within an assembly. Range of tolerances may be received from a database. Range of tolerances may include a manual of mechanical tolerances, such as the "ISO 2768-m" standard, published by the International Organization of Standards, located in CP 401 1214 Vernier, Geneva Switzerland. Tolerance of a part to be manufactured is discussed in more detail in relation to FIG. 3.

Continuing to refer to FIG. 1, memory 108 contains instructions configuring processor 104 to determine a machinability datum 132 as a function of the print of the part to be manufactured and the print model. A "machinability datum," as used herein, is an element of data describing whether a part to be manufactured can be manufactured based on available equipment. "Machinability" as used in the current disclosure is the ease with which a material or part may be machined. In an embodiment, machinability datum 132 may be evaluation of if the part model 120 can be consistently manufactured to a given standard. In a non-limiting example, a machinability datum 132 may be a Boolean value, a score, or a single datum value for the part for manufacture. In an embodiment, machinability datum 132 include a machining process. In embodiments, machinability datum 132 may include subsequent processes after machining such as grinding, polishing, anodizing, plating and painting. Additionally, machinability datum 132 may be a list of geometric features depicted in the model, each of which receives a machinability datum 132. As used herein, "grinding" is a process of removing materials, such as unwanted materials, from a workpiece. As used herein, "anodizing" is a process of creating a protective oxide layer on the surface of a metal part, such as aluminum or titanium parts. As used in this disclosure, "plating" is the process of applying a thin layer of metal onto a part or substrate. Machinability datum 132 could be a vector or table of values linked to and/or corresponding to features. Machinability datum 132 may be based on a consideration of the level of difficulty it would take to machine the given part and keep all its features within the given tolerance range. Machinability datum 132 may also be a consideration of the amount of force it would take to machine the parts without causing deflection of the part in the fixturing system. Both deflection of tool and part may deteriorate accuracy of the part and result in failure of fulfilling the specification. In other embodiments, machinability datum 132 may encompass a consideration if a part can be machined as a function of a set of tools that are required to complete. In some embodiments, user may be presented with an option for in-house or outsourced manufacturing as well as other processes such as grinding and polishing to fulfill surface finish and surface tolerance requirements. In a further embodiment, machinability datum 132 may be determined based on whether manufacturing is in-house or outsourced. In a nonlimiting example, anodizing process may be performed in-house, which may indicate an easier machinability than if process needed to be outsourced.

With continued reference to FIG. 1, machinability datum 132 may encompass two sets of factors: the condition of work materials and the physical properties of work materials. As used in the current disclosure, "work materials" are raw or stock materials that the part is machined out of. Stock materials may include fabricates materials such as materials fabricated in accordance with industrial standards such as the American Society for Testing and Materials (ASTM) and the International Organization for Standardization (ISO). In a nonlimiting example, stock material may include an aluminum alloy fabricated in accordance with the ASTM B209 standard, which is widely used in aerospace and automotive manufacturing. The condition of the work material is determined by eight factors: microstructure, grain size, heat treatment, chemical composition, fabrication, hardness, yield strength, and tensile strength, Physical properties are those of the individual material groups, such as the modulus of elasticity, thermal conductivity, thermal expansion, work hardening, yield strength, tensile strength and density. Machinability datum 132 may be based on operating conditions, cutting tool material and geometry, and the machining process parameters.

With continued reference to FIG. 1, processor 104 may determine machinability datum 132 from the representative part model 108 using several methods. Processor 104 may be configured to decide which method to use as a function for the work materials and the configuration of the part that is being created. Methods of determining machinability datum 132 may include several methods such as the tool life method, tool forces and power consumption method, surface finish method, the Taylor tool life equation, and the machinability rating method. A person of ordinary skill in the art would know that there is no widely accepted consensus method of determining machinability. With that in mind, accurately determining the machinability of different parts and materials may require any method or combination of methods mentioned herein above. Machinability datum 132 may include machinability datum as described in U.S. patent application Ser. No. 17/693,770, filed Mar. 14, 2022, titled "METHOD AND APPARATUS FOR AN INTERACTIVE COMPLIANT MANUFACTURING PROCESS," which is incorporated by reference herein in its entirety.

With continue reference to FIG. 1, memory 108 contains instructions configuring processor 104 to identify an unmanufacturable feature 136 of the part to be manufactured as a function of the machinability datum. An "unmanufacturable feature," as used herein, is a feature that cannot be manufactured using tools available. As used herein, "tools available" include manufacturing, grinding, polishing, anodizing, plating and painting tools. In some embodiments, unmanufacturable feature 136 may be identified as a function of alignment datum 128. In some embodiments, unmanufacturable feature 136 may be identified by comparing tolerance of a feature to a range of tolerances. In a nonlimiting example, processor 104 may identify unmanufacturable feature by identifying that feature tolerance does not fall within a set range of tolerance for that feature. In a non-limiting example, qualities that make unmanufacturable feature 136 may include workpiece material deteriorations, tolerances, geometric features for the part to be manufactured, surface roughness, time, cost, a set of tools, fixturing system, tool accessibility, set-up and load time for the part to be manufactured, machinability datum 132, manufacturability, and the like. If the given quality for a part is outside a predetermined range for any of these considerations the part may be considered unmachinable. In some embodiments, identifying an unmanufacturable feature may include comparing machinability datum 132 for a feature and/or part to a machinability threshold. If, as a non-limiting example, machinability datum 132 exceeds a machinability threshold, a feature and/or part may be deemed to be an unmanufacturable part and/or unmanufacturable feature and/or unacceptably high risk of reject rate upon the fabrication. Or these features may be deemed alternative more expensive processes such as EDM (Electrical discharge machining) and polishing.

Still referring to FIG. 1, memory 108 contains instructions configuring processor 104 to generate a manufacturing quote 140 using a first quoting process as a function of the machinability datum 132 of the part and subsequent processes to be manufactured. A "manufacturing quote," as used herein, is an element of data describing and/or identifying the cost to manufacture a part to be manufactured. A "first quoting process," as used herein, is the process of generating a first quote for the part to be manufactured. First quoting process include comparing part data 112 and part model 120 to manufacturer pricing. "Manufacturer pricing," as used herein, are the prices set by manufacturer based on a set of parameters. Manufacturer pricing may include material costs, fabrication costs, depreciation cost, assembly costs, tooling/setup costs, finishing costs, connection costs, handling costs, shipping costs, expediting costs, packaging costs, markups, volume discounts, margins, etc. manufacturer pricing can be, for example, per-unit costs/prices or one-time costs/prices, depending on the particular parameter. In some embodiments, the first quoting process may be fully automated. Manufacturing pricing may be located in a database. In some embodiments, processor 104 may retrieve manufacturer pricing from a database. In some embodiments, processor 104 may receive manufacturer pricing through a user input. In some embodiments, processor 104 may receive manufacturer pricing by interfacing with an API of the manufacturer. In a nonlimiting example, processor 104 may compare part data 112 to manufacturing pricing in a database and generate manufacturing quote 140 based on the comparison. In some embodiments, processor 104 may simulate manufacturing process in-house and compute pricing. In some embodiments, processor 104 may simulate industrial practiced manufacturing process and compare internal cost and compute the optimum price for profitability. In some embodiments based on data of biting price of suppliers and asking price of buyers, pricing model compute the optimum price which maximize profit. Generating manufacturing quote 140 may include any systems, processes and/or methods described in U.S. patent application Ser. No. 17/150,173, filed Jan. 15, 2021, titled "AUTOMATED FABRICATION PRICE QUOTING AND FABRICATION ORDERING FOR COMPUTER-MODELED STRUCTURES," which is incorporated by reference herein in its entirety. In other embodiments, first quoting process may require human intervention, such as a manual approval of manufacturing quote 140. In some embodiments, manufacturing quote 140 may include cost for one part to be manufactured. In other embodiments, manufacturing quote 140 may include the cost to manufacture a plurality of parts to be manufactured. In an embodiment, manufacturing quote 140 may include the cost to outsource manufacturing of a part to be manufactured. In other embodiments, manufacturing quote 140 may include the cost to manufacture a part to be manufactured by the same entity that generates the manufacturing quote. In some embodiments, manufacturing quote 140 may include descriptive attributes 116 of one or more parts to be manufactured. In some embodiments, manufacturing quote 140 may be generated as a function of a first quoting process. In some embodiments, determining machinability datum 132 comprises comparing manufacturing quote 140 to a set threshold. In some embodiments, determining subsequent process following to the machinable process to full fill the tolerance such as EDM, polishing and quote. In some embodiments incorporate cost of anodizing and plating into the quote. In a nonlimiting example, processor 104 may determine that part to be manufactured cannot be built due to the cost being above a set threshold. In some embodiments, manufacturing quote 140 may be generated using a machine learning model. Machine learning model is described in more detail in FIG. 4.

With continued reference to FIG. 1, processor 104 may be configured to transmit manufacturing quote 140 to a user device 144. A "user device," as used herein, is a computing device capable of displaying a Graphical User Interface (GUI) to a user. User device 144 may include any computing device capable of displaying a GUI. In an embodiment, user device 144 may include any computing device described in this disclosure. In some embodiments, processor is configured to receive a user selection from user device 144. In an embodiment, user device 144 may be configured to accept or reject manufacturing quote 140. A "user selection," as used herein, is a selection by the user as to accept or reject manufacturing quote 140. In some embodiments, user device 144 may be configured to add or remove parts to be manufactured from manufacturing quote 140. In some embodiments, processor 104 is configured to instantaneously generate manufacturing quote 140. An "instantaneous" manufacturing quote 140, as used herein, is a quote generated without the use of toolpathing. As used herein, "toolpathing" is a process of generating a toolpath for a computer numeric control (CNC) machine tool. Instantaneous manufacturing quote 140 may include any method of instantaneous quoting described in U.S. patent application Ser. No. 17/395,119, filed Aug. 5, 2021, titled "METHODS AND SYSTEMS FOR OF GENERATING AN INSTANTANEOUS QUOTE OF ANY PART WITHOUT TOOL-PATHING," which is incorporated by reference herein in its entirety.

Continuing to refer to FIG. 1, memory 108 contains instructions configuring processor 104 to generate an alternate manufacturing quote 148 using a second quoting process as a function of the machinability datum 132 of the part to be manufactured and the identification of an unmanufacturable feature 136. An "alternate manufacturing quote," as used herein, is a second manufacturing quote that is generated describing parts and/or features that cannot be easily manufactured and/or result in unacceptable reject rate. In some embodiments, alternate manufacturing quote 148 may be generated after manufacturing quote 140. In other embodiments, alternate manufacturing quote 148 may be generated in tandem with manufacturing quote 140. In embodiments, processor 104 may be configured to transmit alternate manufacturing quote 148 to user device 144. In a nonlimiting example, both manufacturing quote 140 and alternate manufacturing quote 148 may be transmitted at the same time to a user device 144, where user can see information related to parts to be manufactured and parts/features that cannot be manufactured. In some embodiments, alternate manufacturing quote 148 may include only costs for unmanufacturable feature. In other embodiments, alternate manufacturing quote 148 may include only costs related to machinability datum 132. In an embodiment, alternate manufacturing quote 148 may be generated as a function of a second quoting process. A "second quoting process," as used herein, is the process of generating a second manufacturing quote. In some embodiments, second quoting process may occur after the first manufacturing quoting process. In some embodiments, second quoting process may occur as to provide user information related to parts and/or features that cannot be easily manufactured. In some embodiments, alternate manufacturing quote 148 may include costs related to parts deemed too expensive to manufacture. In some embodiments, manufacturing quote incorporate reject rate of the process. In some embodiments, alternate manufacturing quote may list the parts and/or features deemed unmanufacturable. In a nonlimiting example, user may be provided with alternate manufacturing quote 148 as to provide information as to what parts cannot be manufacturable, where alternate manufacturing quote 148 may allow user to make a new quoting request with a different set of part data 112.

Continuing to refer to FIG. 1. in some embodiments, second quoting process may include human intervention, such as requiring manual approval by a human. In other embodiments second quoting process may be fully automated. In some embodiments, first quoting process and/or second quoting process may include conditions that triggers a review by a human. In some embodiments, human review may be triggered before manufacturing quote 140 and/or alternate manufacturing quote 148 are transmitted to user device 144. In some embodiments, human review may be triggered as a function of comparing part model 120 to outputs from manufacturing machine learning model. In some embodiments, processor 104 may be configured to generate a separate set of manufacturing quotes based on outputs from manufacturing machine learning model. In a further embodiment, manufacturing quote 140 may be compared to quotes generated for the outputs of manufacturing machine learning model. In an embodiment, the machine learning model incorporate past equivalent parts ask price of buyer and bid price of manufacture, process 104 compute optimum price based on market price model. In an embodiment, machine learning model incorporate seasonal demand model from the past bid and ask prices and number of quote requests. Manufacturing quote 140 and/or alternate manufacturing quote 148 may include any method of generating a manufacturing quote described in U.S. patent application Ser. No. 17/150,173, filed Jan. 15, 2021, titled "AUTOMATED FABRICATION PRICE QUOTING AND FABRICATION ORDERING FOR COMPUTER-MODELED STRUCTURES," which is incorporated by reference herein in its entirety. In a nonlimiting example, processor 104 may generate manufacturing quote 140 and also generate a separate set of quotes for outputs of machinability machine learning model, and then compare the manufacturing quote 140 to the quotes generated for the manufacturing machine learning model, where a human review may be triggered based on that comparison. In an embodiment, human review may be triggered if difference between manufacturing quote 140 and quotes generated based on output from manufacturing machine learning model is above a set threshold. In a nonlimiting example, set threshold may be a threshold set by a manufacturer included in a database, such as a threshold that triggers review if manufacturing quote 140 is above quote generated for manufacturing machine learning model by $200. In some embodiments, set threshold may be a dollar (or other monetary) amount, or it may be a percentage of the total cost of one of the manufacturing quotes. In some embodiments, conditions that trigger a review may include costs for manufacturing being higher than a threshold set by the user, too many parts being deemed unmachinable, too many features being unmanufacturable, and the like. In a further embodiment, human review may be triggered every time an alternate manufacturing quote 148 is generated. In a nonlimiting example, every time there is a part and/or feature that is deemed too costly or difficult to be manufactured, a human review may be triggered. In some embodiments, human review of manufacturing quote 148 may be triggered by a user selection. In a nonlimiting example, a human review may be triggered when user rejects manufacturing quote 148. Machine learning model is described in more detail in reference to FIG. 4.

Figure 2:
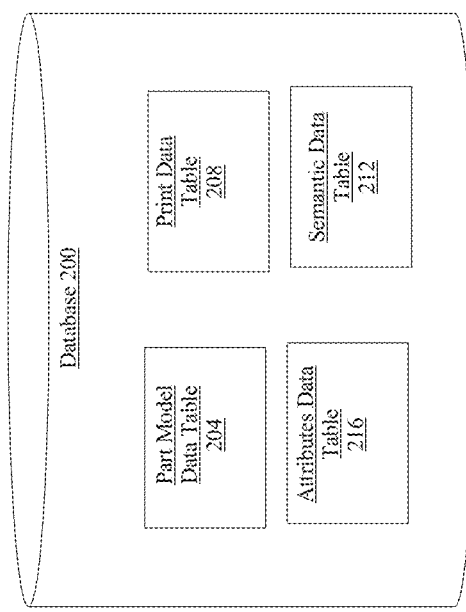
FIG. 2 is an exemplary diagram of a manufacturing requirements database.

Now referring to FIG. 2, a database 200 with manufacturing requirements is illustrated. Database 200 may be implemented as a hardware and/or software module. Database 200 may be implemented, without limitation, as a relational database, a key-value retrieval datastore such as a NOSQL database, or any other format or structure for use as a datastore that a person skilled in the art would recognize as suitable upon review of the entirety of this disclosure. Database 124 may contain datasets that may be utilized by unsupervised machine-learning model to find trends, cohorts, and shared datasets between data contained within database 200 and part model 120. In an embodiment, datasets contained within database 200 may be categorized and/or organized according to shared characteristics. For instance, and without limitation, one or more tables contained within database 200 may include part model data table 204. As a further example and without limitation, one or more tables contained within database 124 may include print data table 208, wherein print data table 208 may include stored print 124.

With continued reference to FIG. 2, one or more tables contained within the database may include semantic data table 212. Semantic data table 212 may include shapes, symbols, annotations, text, embedded information, and/or the like that contain semantic information as discussed above including the associated measurements and components of part to be manufactured 116, and corresponding semantic information. In an embodiment, one or more tables contained within database 200 may include descriptive attribute data table 216. Descriptive attribute data table 216 may include a plurality of descriptive attributes 116. part model data table 204 and descriptive attribute data table 216 may be used for training a manufacturing machine learning model.

Figure 3:
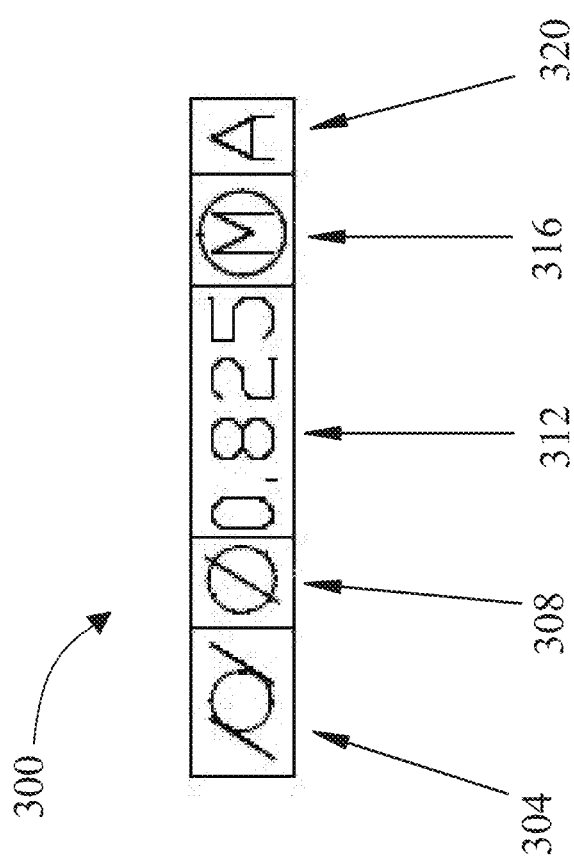
FIG. 3 is an exemplary illustration of a geometric tolerance of a part to be manufactured.

Now referring to FIG. 3, an exemplary illustration of a geometric tolerance 300 of a part to be manufactured is presented. A "geometric tolerance," as used in this disclosure, is the maximum allowable variation in the geometry defined by part model 120. In this nonlimiting exemplary embodiment, geometric tolerance includes a geometric characteristic symbol 304. A "geometric characteristic symbol," as used herein, is the geometric characteristic to which the tolerance is applied, such as location, orientation and form. In this nonlimiting example, geometric characteristic symbol 304 indicates that geometric tolerance 300 applies to a cylindrical shape. Continuing with the example, without limitations, geometric tolerance 300 may include a diameter symbol 308. A "diameter symbol," as used herein, indicates that tolerance applies to the diameter of the part to be manufactured. Diameter symbol 308 may or may not be present depending on whether tolerance is applied to the diameter of the part to be manufactured. In this nonlimiting example, the presence of diameter symbol 308 indicates that geometric tolerance applies to the diameter of part to be manufactured. Continuing with the nonlimiting example, geometric tolerance 300 includes a tolerance value 312. Tolerance value 312 may be only one value. In some embodiments, tolerance value 312 may include a second value. In other embodiments, tolerance value 312 may include a projected tolerance value. A "projected tolerance value," as used herein, is a height value followed by a projected tolerance symbol. In an example, without limitations, projected tolerance value may be used to indicate a perpendicularity of an embedded part.

Continuing to refer to FIG. 3, in a nonlimiting embodiment, geometric tolerance 300 may include a materials condition 316. A "materials condition," as used herein, indicates the amount of material to be used based on the size of the part to be manufactured. In this nonlimiting example, the "M" symbol inside the circle indicates that part to be manufactured has the maximum amount of material for the size to be manufactured. Continuing with this nonlimiting embodiment, geometric tolerance 300 may include a datum reference 320. A "datum reference," as used herein, indicates which perpendicular plane the measurement is made. In this nonlimiting example, the letter "A" indicates that geometric tolerance 300 applies to a first perpendicular plane out of three perpendicular planes. It will become apparent to one of ordinary skill in the art, upon reading this disclosure, that geometric tolerance 300 is presented only as a way of example and that alignment datum 128 may be verified using any other methods available.

Figure 4:
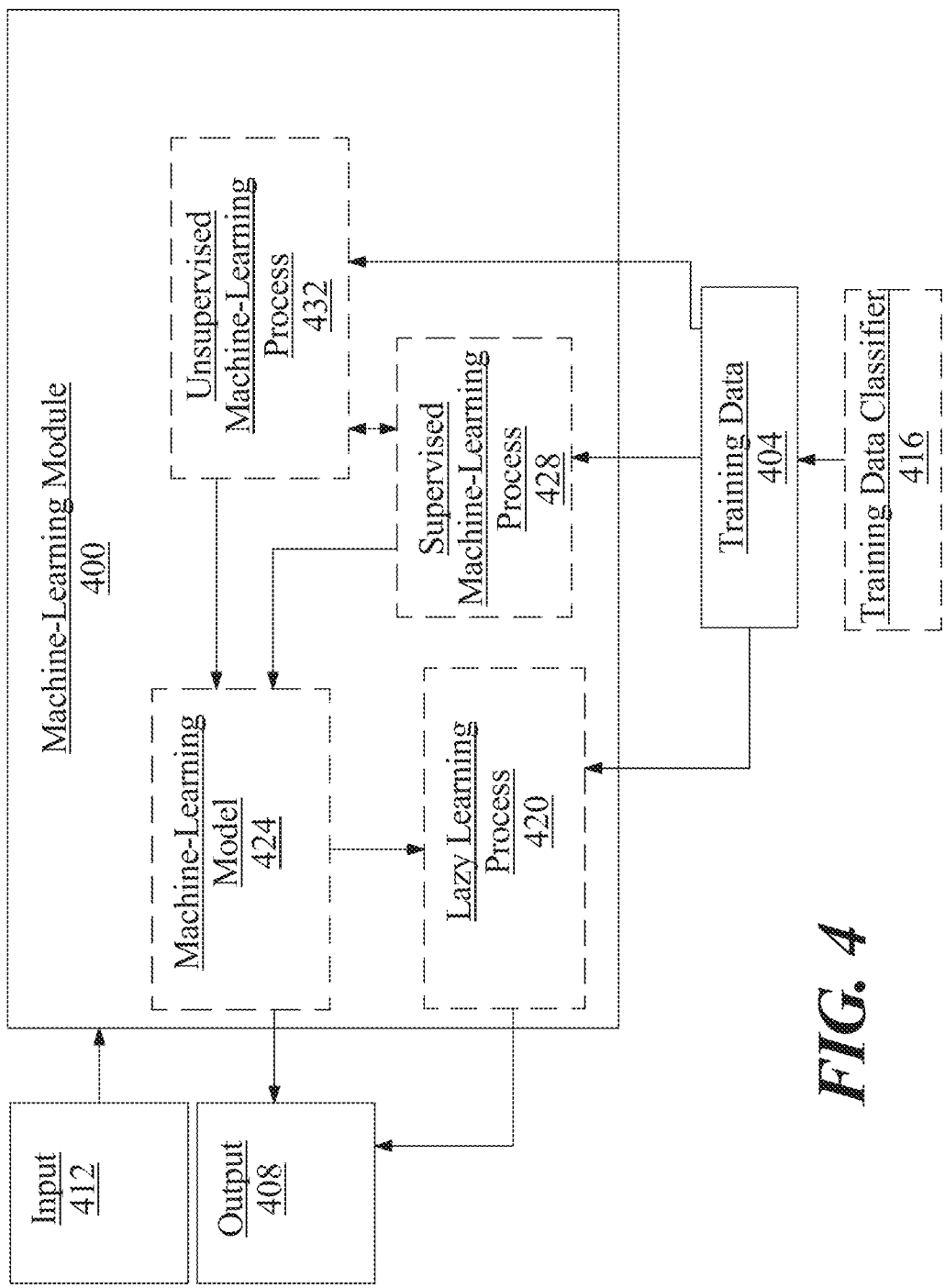
FIG. 4 is an illustrative embodiment of a machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. Machine-learning model may perform supply and demand determination for the parts from market data in the database. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example descriptive attributes 116 may be used as inputs, where part model 120 are outputted.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to manufacturing specifications such as materials used and dimensions.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include descriptive attributes 116 as described above as inputs, part model 120 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
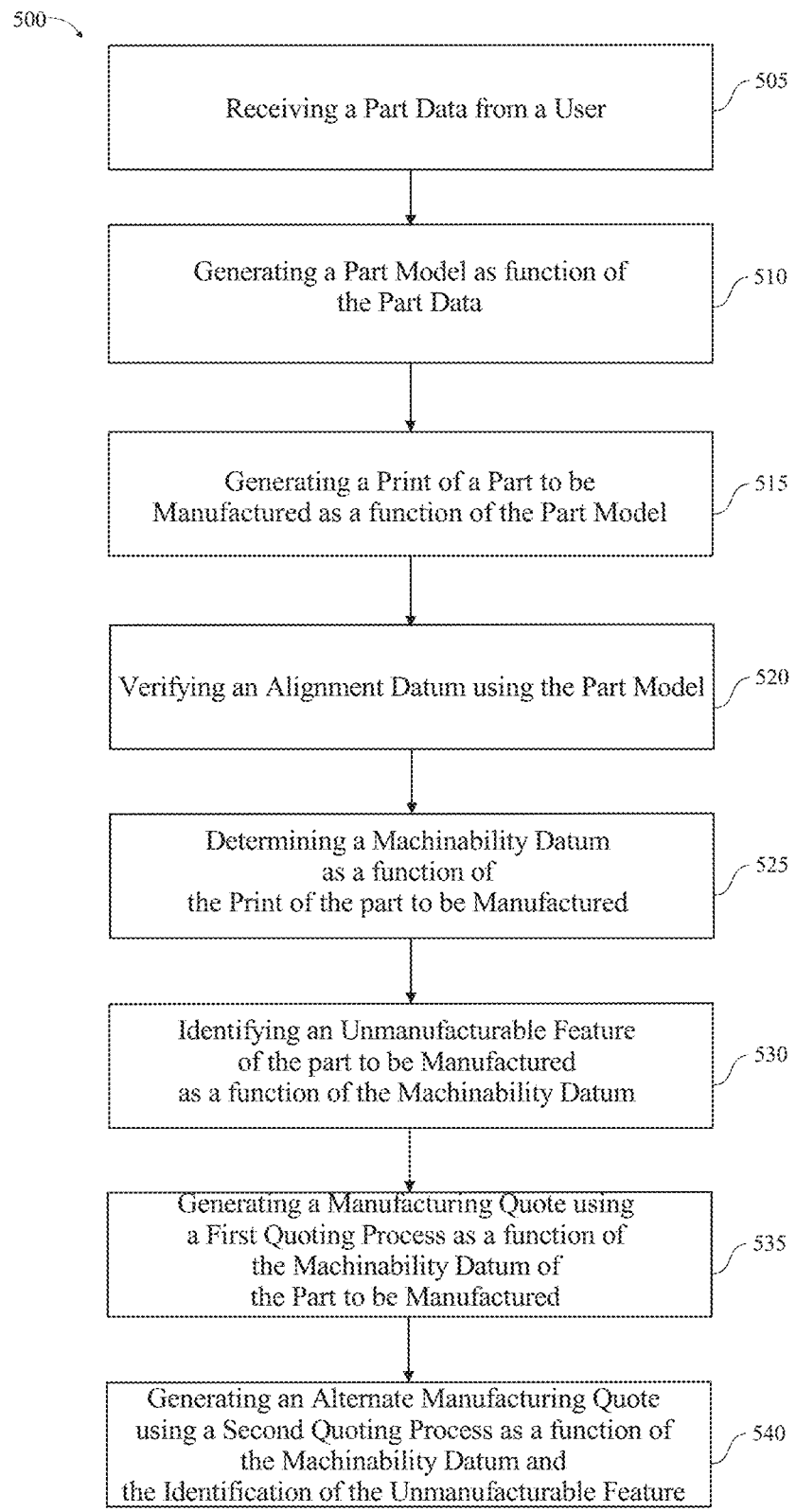
FIG. 5 is flow diagram illustrating an embodiment of a method for structured part quoting.

Referring now to FIG. 5, method 500, at step 505 includes receiving, by at least a processor 104, a part data 112 from a user. In embodiments, part data 112 includes descriptive attributes. In some embodiments, method 500 may include receiving at least a descriptive attribute as a function of a selection from a list comprising a plurality of descriptive attributes. This step may be implemented as disclosed with reference to FIGS. 1-4.

Continuing to refer to FIG. 5, at step 510, method 500 includes generating, by the at least a processor 104, a part model 120 as a function of the part data 112. In some embodiments, part model 120 may be generated using a manufacturing machine learning model. In some embodiments, part model 120 may be a computer model. This step may be implemented as disclosed with reference to FIGS. 1-4.

With continued reference to FIG. 5, method 500, at step 515 includes generating, by the at least a processor 104, a print 124 of a part to be manufactured as a function of the print model 120, wherein the part to be manufactured is configured to be in a first orientation within the print 124. This step may be implemented as disclosed with reference to FIGS. 1-4.

Still referring to FIG. 5, at step 520, method 500 includes verifying, by the at least a processor 104, an alignment datum 128 using the part model 120. This step may be implemented as disclosed with reference to FIGS. 1-4.

Continuing to refer to FIG. 5, at step 525, method 500 includes determining, by the at least a processor 104, a machinability datum 132 as a function of the print 124 of the part for manufacture and the part model 120. This step may be implemented as disclosed with reference to FIGS. 1-4.

With continued reference to FIG. 5, method 500, at step 530, includes identifying, by the at least a processor 104, an unmanufacturable feature 136 of the part to be manufactured as a function of the machinability datum 132. In some embodiments, method 500 may include identifying the unmanufacturable feature 136 by comparing tolerance of a feature to a range of tolerances. This step may be implemented as disclosed with reference to FIGS. 1-4.

Still referring to FIG. 5, at step 535, method 500 includes generating, by the at least a processor, a manufacturing quote 140 using a first quoting process as a function of the machinability datum of the part to be manufactured. In some embodiments, method 500 further includes transmitting manufacturing quote 140 to user device 144. In an embodiment, method 500 includes receiving a user selection of the manufacturing quote 140 from user device 144. In some embodiments, manufacturing quote 140 may be instantaneously generated. This step may be implemented as disclosed with reference to FIGS. 1-4.

Continuing to refer to FIG. 5, method 500, at step 540, includes generating, by the at least a processor 104, an alternate manufacturing quote 148 using a second quoting process as a function of the machinability datum 132 of the part to be manufactured and the identification of an unmanufacturable feature 136. In some embodiments, method 500 further includes transmitting the alternate manufacturing quote 148 to a user device 144. This step may be implemented as disclosed with reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
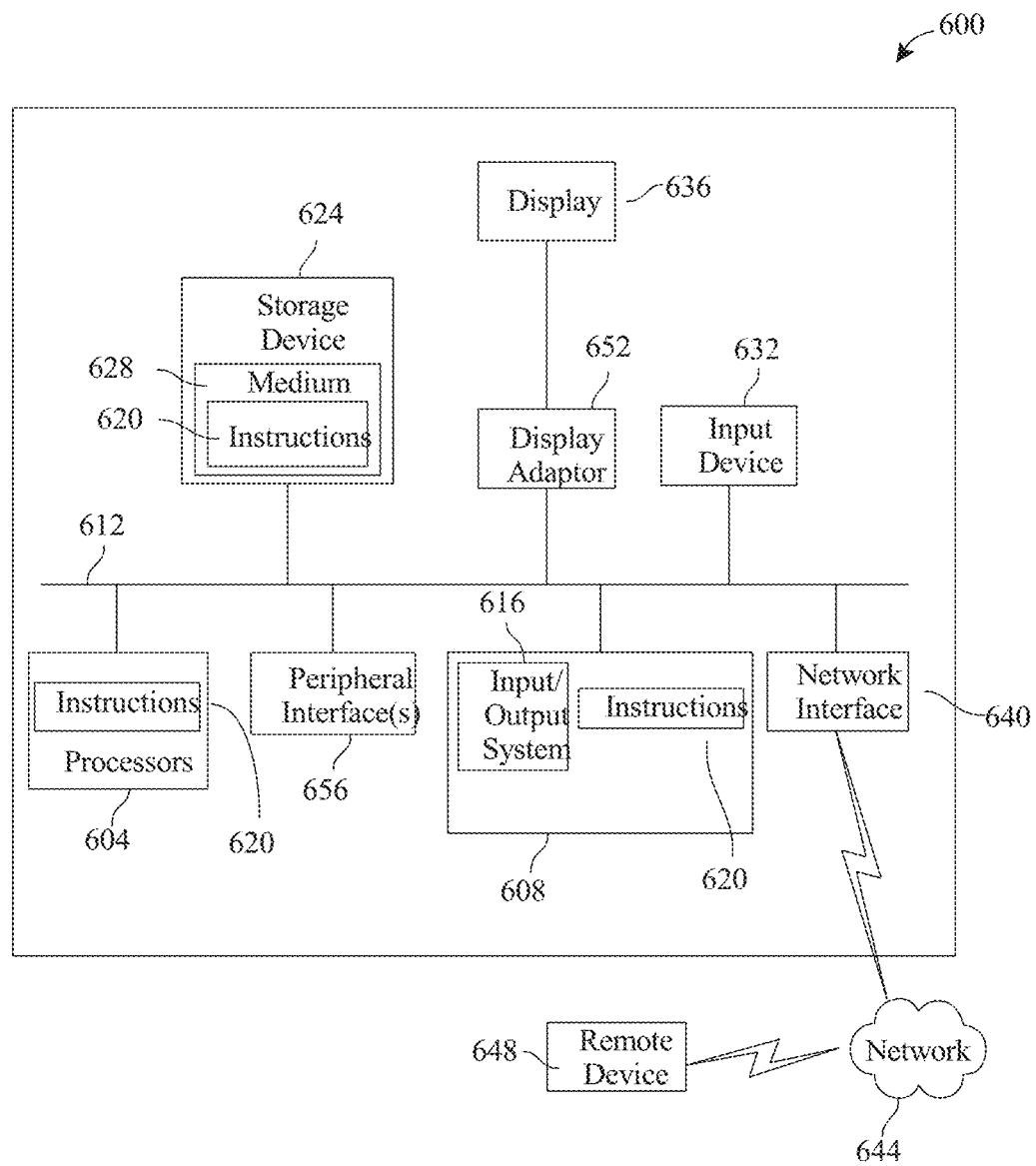
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatus, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An Apparatus for structured part quoting, the apparatus comprising:
at least a processor;
a memory configuring the at least a processor to:
receive a part data from a user;
generate a three-dimensional part model in a computer-aided design (CAD) modeling software as a function of the part data using a manufacturing machine learning model;
generate a print of a part for manufacture as a function of the three-dimensional part model, wherein the part for manufacture is in a first orientation within the print, the print comprising at least one side view and at least one section view;
decomposing at least one of the at least one side view and at least one section view;
verify an alignment datum using the three-dimensional part model, wherein the alignment datum is an element data describing how the part to be manufactured fits with other parts within an assembly;
determine a machinability datum as a function of the print of the part for manufacture and the three dimensional part model, wherein the machinability datum is an element of data describing the manufacturability of a part, wherein the element of data comprises at least a calculation of an amount of force required to machine the three-dimensional part model without causing deflection of a part in a fixturing system;
identify an unmanufacturable feature of the part to be manufactured as a function of the machinability datum and the alignment datum, wherein identifying the unmanufacturable feature of the part to be manufactured comprises comparing the machinability datum of a feature to a machinability threshold and comparing the manufacturability to a predetermined threshold;
simulate at least one manufacturing process for the part for manufacture, wherein the simulation further comprises:
simulating an industrial practiced manufacturing process;
comparing an internal cost of manufacturing; and
computing an optimum price for profitability;
generate a manufacturing quote using a first quoting process as a function of the machinability datum of the part to be manufactured and simulating the at least one manufacturing process wherein the manufacturing quote further comprises a reject rate;
transmit the manufacturing quote to a user device, wherein the user can accept or reject a manufacturing quote, wherein the user can further add or remove parts to be manufactured from the manufacturing quote;
generate an alternate manufacturing quote using a second quoting process as a function of the machinability datum of the part to be manufactured and the identification of an unmanufacturable feature, wherein the manufacturing quote provides information as to what parts cannot be manufactured, wherein the manufacturing quote further allows the user to make a new quoting request with a different set of part data; and
approve the second quoting process, wherein the approval of the second quoting process is triggered by at least a condition of manufacturability, wherein the approval of the second quoting process is required before the alternate manufacturing quote is provided to the user.

2. The apparatus of claim 1, wherein the processor is further configured to receive a user selection of the manufacturing quote from the user device.

3. The apparatus of claim 1, wherein part data comprises at least the descriptive attribute.

4. The apparatus of claim 1, wherein the manufacturing quote is instantaneously generated.

5. The apparatus of claim 1, wherein the processor is further configured to transmit the alternate manufacturing quote to the user device.

6. The apparatus of claim 1, wherein the part model comprises a computer model.

7. The apparatus of claim 1, wherein the processor is configured to receive at least the descriptive attribute as a function of a selection from a list comprising a plurality of descriptive attributes.

8. The apparatus of claim 1, wherein the processor is further configured to identify the unmanufacturable feature by comparing a tolerance of a feature to a range of tolerances.

9. A method for structured part quoting, the method comprising:
receiving, by at least a processor, a part data from a user;
generating, by the at least a processor, a three-dimensional part model in a computer-aided design (CAD) modeling software as a function of the part data using a manufacturing machine learning model wherein generating the part model;
generating, by the at least a processor, a print of a part for manufacture as a function of the part model, wherein the part for manufacture is in a first orientation within the print, the print comprising at least one side view and at least one section view;
decomposing at least one of the at least one side view and at least one section view;
verifying, by the at least a processor, an alignment datum using the part model, wherein the alignment datum is an element data describing how the part to be manufactured fits with other parts within an assembly;
determining, by the at least a processor, a machinability datum as a function of the print of the part for manufacture and the three-dimensional part model, wherein the machinability datum is an element of data describing the manufacturability of a part, wherein the element of data comprises at least a calculation of an amount of force required to machine the three-dimensional part model without causing deflection;
identifying, by the at least a processor, an unmanufacturable feature of the part to be manufactured as a function of the machinability datum and the alignment datum, wherein identifying the unmanufacturable feature of the part to be manufactured comprises comparing the machinability datum of a feature to a machinability threshold and comparing the manufacturability to a predetermined threshold;
simulating, by the at least a processor, at least one manufacturing process for the part for manufacture, wherein the simulation further comprises:
simulating an industrial practiced manufacturing process;
comparing an internal cost of manufacturing; and
computing an optimum price for profitability;
generating, by the at least a processor, a manufacturing quote using a first quoting process as a function of the machinability datum of the part to be manufactured wherein the manufacturing quote further comprises a reject rate;

transmitting, by the at least a processor, the manufacturing quote to a user device, wherein the user can accept or reject a manufacturing quote, wherein the user can further add or remove parts to be manufactured from the manufacturing quote;

generating, by the at least a processor, an alternate manufacturing quote using a second quoting process as a function of the machinability datum of the part to be manufactured and the identification of an unmanufacturable feature, wherein the manufacturing quote provides information as to what parts cannot be manufactured, wherein the manufacturing quote further allows the user to make a new quoting request with a different set of part data; and approving, by the at least a processor, the second quoting process, wherein approval of the second quoting process is triggered by at least a condition of manufacturability, wherein the approval of the second quoting process is required before the alternate manufacturing quote is provided to the user.

10. The method of claim 9, wherein the method further comprises receiving a user selection of the manufacturing quote from the user device.

11. The method of claim 9, wherein the part data comprises at least the descriptive attribute.

12. The method of claim 9, wherein the manufacturing quote is instantaneously generated.

13. The method of claim 9, wherein the method further comprises transmitting the alternate manufacturing quote to the user device.

14. The method of claim 9, wherein the part model comprises a computer model.

15. The method of claim 9, wherein the method further comprises receiving at least the descriptive attribute as a function of a selection from a list comprising a plurality of descriptive attributes.

16. The method of claim 9, wherein the method further comprises identifying the unmanufacturable feature by comparing a tolerance of a feature to a range of tolerances.

* * * * *